United States Patent [19]

Sakumoto

[11] 4,437,621
[45] Mar. 20, 1984

[54] HANDLE FOLDING DEVICE FOR FISHING REEL

[75] Inventor: Akinori Sakumoto, Tokyo, Japan
[73] Assignee: Daiwa Seiko Inc., Tokyo, Japan
[21] Appl. No.: 330,812
[22] Filed: Dec. 15, 1981
[30] Foreign Application Priority Data Jan. 27, 1981 [JP] Japan ................... 56-10449

[51] Int. Cl.³ .................. A01K 89/00; G05G 1/00
[52] U.S. Cl. .................... 242/84.1 J; 74/547
[58] Field of Search ............ 242/84.1 J, 84.1 R, 242/84.21 R, 84.2 R; 74/546, 547

[56] References Cited
U.S. PATENT DOCUMENTS

| 248,474 | 10/1881 | Kells, Jr. | ................. 74/547 |
| 3,091,978 | 6/1963 | Rubinstine | ............... 74/547 |
| 4,310,127 | 1/1982 | Yamasaki | ............ 242/84.1 J |

*Primary Examiner*—Billy S. Taylor
*Attorney, Agent, or Firm*—Browdy and Neimark

[57] ABSTRACT

A handle folding device for a fishing reel is disclosed which is capable of absorbing the shake resulting from micro-small gaps between a handle shaft and a handle and between the handle and a handle stopper, permitting the handle to engage reliably and integrally with the handle shaft and insuring smooth rotation of the handle. The handle folding device has a construction in which the handle can be folded quickly and smoothly with a one-touch operation by rotating the handle while depressing the handle stopper protruding from the upper face of the handle against a spring, and in which the handle thus folded can be automatically fitted to the handle shaft when it is merely rotated to resume its original position.

4 Claims, 12 Drawing Figures

HANDLE FOLDING DEVICE FOR FISHING REEL

BACKGROUND OF THE INVENTION

This invention pertains to an improvement in or relating to a fishing reel and more specifically, to a foldable handle of a spinning reel.

As a quick folding handle system with one touch operation for easily carrying and packaging a spinning reel, there has been known a system in which the handle is folded inwardly and orthogonally with respect to a plane including the handle and a handle shaft to accommodate the handle more compactly. An example of such prior art is U.S. Pat. No. 4,253,618.

In accordance with this prior art system, bifurcated portions at the tip of the handle C are pivoted to a tenon B formed integrally at the end of the handle shaft A, and an engaging plate F of a handle stopper or trigger E is slidably fitted to an engaging recess D formed on the tenon B in the wedge arrangement so as to permit folding of the handle, as depicted in FIGS. 9 and 10. According to this construction, when the handle is fitted or raised, the engaging plate F of the handle stopper or trigger E fits into the engaging recess D of the tenon of the handle shaft A like a wedge, thereby integrally fixing the handle stopper or trigger E and the handle shaft A. However, this handle stopper or trigger E is slidably fitted into a split groove hole of the handle, and a micro-small gap G exists between these members due to the error in accuracy during production or for other reasons. Similarly, a micro-small gap H exists between the end face of the bifurcated portions of the handle C and the end face of the handle shaft A. Consequently, the handle C is likely to shake on the handle shaft A when the handle is fitted or raised, so that rotation of the handle can not be carried out smoothly.

SUMMARY OF THE INVENTION

The present invention is therefore directed to provide a solution to the problem with the one-touch foldable handle of the prior art.

The primary object of the present invention is to provide a handle folding device for a fishing reel which is capable of absorbing the shake resulting from the micro-small gaps between the handle shaft and the handle and between the handle and the handle stopper or trigger, permitting the handle to engage with the handle shaft reliably and integrally, insuring smooth rotation of the handle.

It is another object of the present invention to provide a handle folding device for a fishing reel having such a construction in which the handle can be folded quickly and smoothly in a one-touch operation by rotating the handle while depressing the handle stopper protruding from the upper face of the handle against a spring, and in which the handle thus folded can be automatically fitted to the handle shaft when it is merely rotated to resume its original position.

These and other objects will become more apparent from the following description taken in conjunction with the accompanying drawings.

DESCRIPTION OF THE PREFERRED EMBODIMENTS

Figure 4:
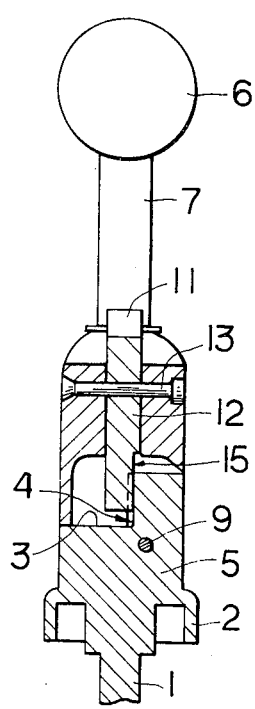
FIG. 4 is a sectional view taken along line II—II of FIG. 2.

With reference to the accompanying drawings, a handle seat 2 is shown formed integrally on one end surface of a handle shaft 1 of a spinning reel. A notched step 3 (best seen in FIGS. 4, 7 and 8) is formed on one side at the upper part of the handle seat 2 and a tenon 5 having a tapered engaging face 4 on the elevated front face of the notched step is integrally formed on the handle seat 2 so as to protrude therefrom. The tenon 5 engages with bifurcated portions 8, 8 of a handle 7, formed in a customary manner at the top of the handle having a grip 6, so that the handle 7 can be folded in the direction opposite the notched step 3 by means of a pin 9. The lower end faces 8' of the bifurcated portions 8, 8 come into contact with the handle seat 2 and in particular their end faces 8" on the folding side are shaped in an arcuate form so that they do not hinder the folding operation of the handle.

A split groove hole 10 is formed on the bent portion at the tip of the handle 7 in such a manner as to orthogonally cross the bifurcated portions 8, 8, and a handle stopper or trigger 12 having an operation portion 11 is turnably pivoted into the split groove hole 10 by means of a shaft 13. The handle stopper or trigger 12 is urged by a spring 14 so that its operation portion 11 projects beyond the upper surface of the handle. An engaging cam face 15, which is capable of coming into sliding contact with the tapered engaging face of the tenon 5, is defined on one side face at the inner tip of the handle stopper or trigger 12.

Figure 12:
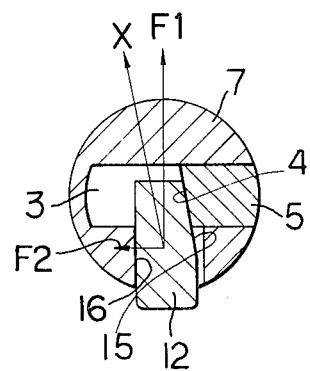
FIG. 12 is a sectional view taken along line B—B of FIG. 11.
Figure 10:
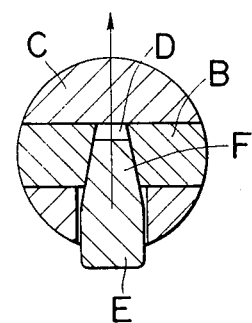
FIG. 10 is a sectional view taken along line A—A of FIG. 9.

As best seen in FIG. 12, the engaging cam face 15 of handle stopper or trigger 12 enters groove 10 with a force F1, proportional to the spring force of spring 14. As cam face 15 makes sliding contact with tenon 5, it engages tapered face 4. As a result of its taper, however, face 4 exerts a force F2 substantially normal to the direction of insertion of trigger 12 against cam face 15. Face 16 of groove 10, located adjacent the side of trigger 12 opposite cam face 15, exerts a reactive force on that opposite side of trigger 12 proportional, and in opposition, to force F2 so that the resultant motion of the trigger 12, upon insertion of the trigger into the groove, is in the direction of arrow x. Consequently, trigger 12 is sandwiched between face 16 of handle 7 and face 4 of tenon 5, and as trigger 12 penetrates further into groove 10, it is urged in the direction x thus rendering the handle 7 rigidly mounted on the tenon 5.

Figure 1:
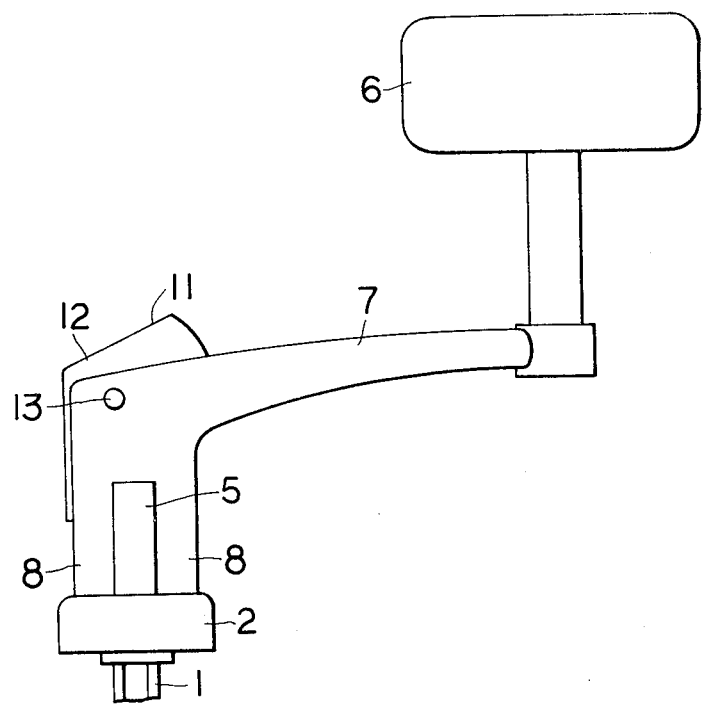
FIG. 1 is a front view of the device in its raised or unfolded position in accordance with the present invention.
Figure 3:
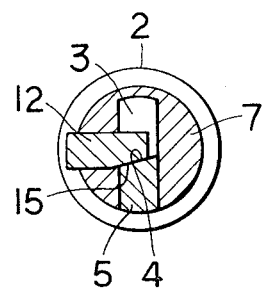
FIG. 3 is a sectional view taken along line I—I of FIG. 2.
Figure 2:
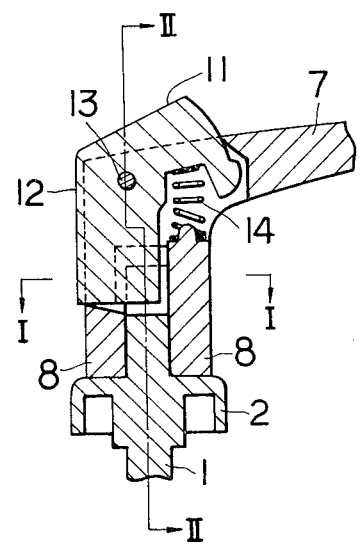
FIG. 2 is a longitudinal sectional front view of the device of FIG. 1.
Figure 5:
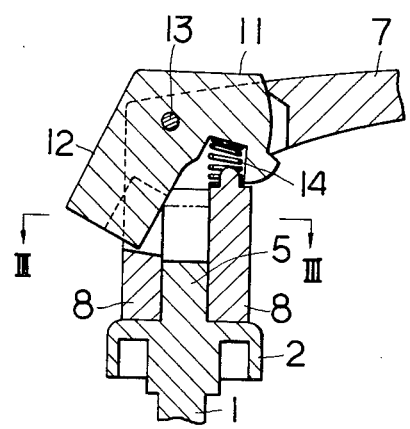
FIG. 5 is a longitudinal sectional front view showing the the present device in its raised or unfolded position with the trigger released.
Figure 6:
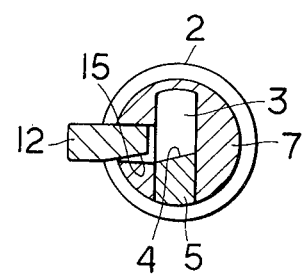
FIG. 6 is a sectional view taken along line III—III of FIG. 5.
Figure 7:
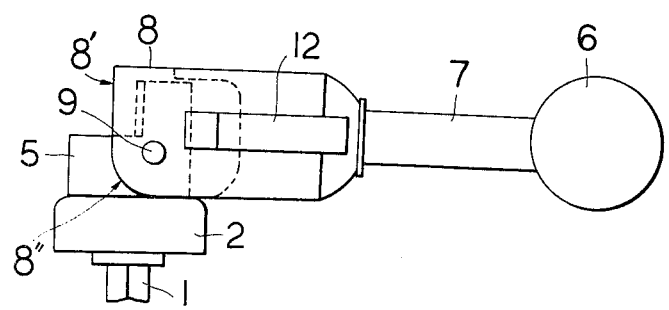
FIG. 7 is a side view showing the state when the handle of the present invention is folded.
Figure 8:
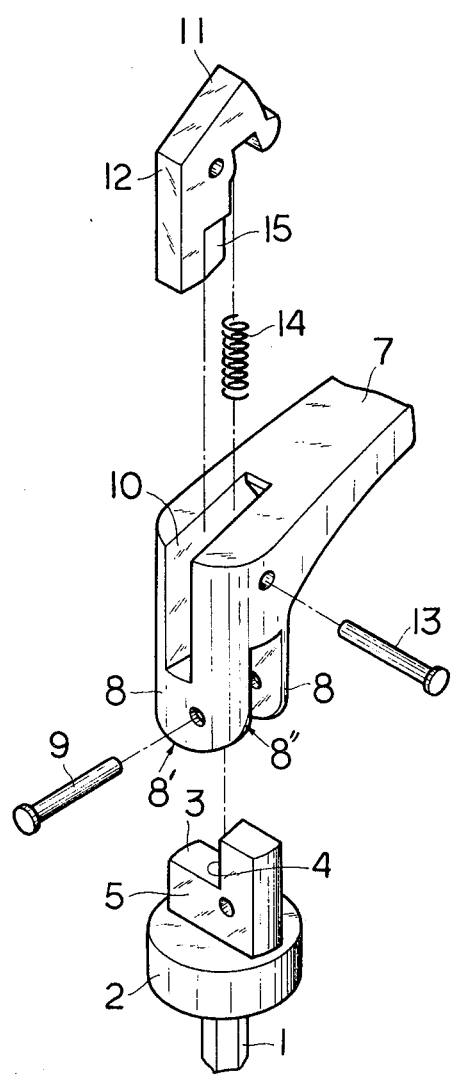
FIG. 8 is an exploded perspective view of the present device.
Figure 11:
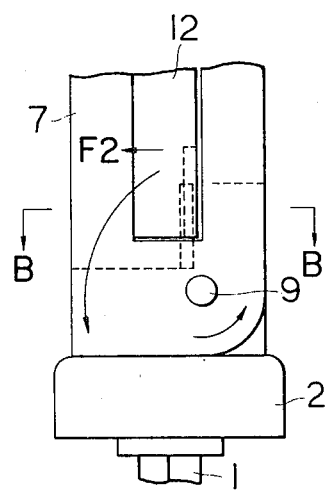
FIG. 11 is a side view of the present device with the trigger engaged.
Figure 9:
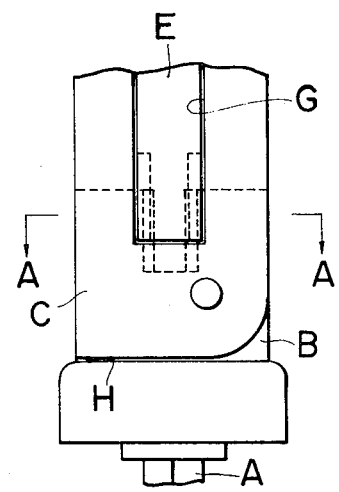
FIG. 9 is a side view of a prior art handle.

Since this embodiment is constructed as described above, when the operation portion 11 of the handle stopper 12 is depressed against the force of the spring 14 from the mounted state of the handle 7 shown in FIGS. 1 and 2, the handle stopper or trigger 12 rotates about shaft 13 as shown in FIG. 5 and its engaging cam face 15 disengages from the notched step 3 of the tenon 5. In consequence, the handle 7 can rotate inward about pin 9 as depicted in FIG. 7 and thus be folded.

For raising the handle 7 from this folded state to its unfolded position, the handle 7 is rotated in the opposite direction, or counterclockwise, about pin 9, whereby the engaging cam face 15 of the handle stopper or trigger 12 urged by the spring 14 enters the notched step 3 and comes into sliding contact with the tapered engaging face 4 of the tenon 5, thereby locking and fixing the handle 7 in the mounted or unfolded state.

Having described a specific embodiment of the device of this invention, it is believed obvious that modifications and variations of the present device are possible in the light of the above teachings without departing from the spirit and scope of the invention.

What is claimed is:

1. A trigger-actuated folding handle for fishing reel having a folded inoperative position and a non-folded operative position, comprising:
   a reel shaft defining an axis of rotation:
   a tenon formed on an end face of said shaft for rotation about said axis, said tenon including a notched step at its outer end including a first camming surface disposed generally parallel to said shaft axis;
   a handle member including a groove, pivot means mounting said handle on said tenon for pivotal motion about a handle member axis disposed substantially normal to said tenon and said shaft axis, and further disposed to one side of said shaft axis;
   a trigger member mounted on pivot means on said handle member for pivotal motion in said groove about an axis disposed substantially normal to both said shaft axis and said handle member axis, said trigger member being formed with a second camming surface for coaction with said first camming surface so that said first camming surface exerts a force against said second camming surface when said folding handle is moved into the operative non-folded position, said trigger member being located substantially in a plane which includes said shaft axis in said non-folded position and having another surface positioned substantially opposite said first and second camming surfaces of said non-folded position, said handle member including surface means bearing against said another surface, for exerting a reactive force against said another surface when said folding handle is moved into said non-folded position to counteract said exerted force, the interaction of said first camming surface with said second camming surface and said another surface with said surface means causing said trigger member to be canted within said groove and firmly wedged between said tenon and said handle member, when said folding handle is moved into said non-folded position, thereby rendering said handle rigidly mounted on said tenon in said operative position.

2. The folding handle of claim 1 wherein said handle member includes an end portion located adjacent said tenon, said end portion having arcuate shape.

3. The folding handle of claim 2 wherein said end portion is bifurcated.

4. The folding handle of claim 1 wherein said handle member includes means disposed within said groove, for biasing said trigger member second camming surface into engagement with said first camming surface to said non folded position.

* * * * *